H. S. EADES.
DYNAMO ELECTRIC MACHINE.
APPLICATION FILED JUNE 29, 1920.

1,388,555.

Patented Aug. 23, 1921.
2 SHEETS—SHEET 1.

INVENTOR
H. S. EADES.
by D. Anthony Usina
his Attorney

H. S. EADES.
DYNAMO ELECTRIC MACHINE.
APPLICATION FILED JUNE 29, 1920.

1,388,555.

Patented Aug. 23, 1921.
2 SHEETS—SHEET 2.

INVENTOR
H. S. EADES.
by D. Anthony Usina
his Attorney

UNITED STATES PATENT OFFICE.

HERBERT S. EADES, OF PHILADELPHIA, PENNSYLVANIA.

DYNAMO-ELECTRIC MACHINE.

1,388,555.            Specification of Letters Patent.   Patented Aug. 23, 1921.

Application filed June 29, 1920. Serial No. 392,854.

*To all whom it may concern:*

Be it known that I, HERBERT S. EADES, a citizen of the United States, and resident of Philadelphia, in the county of Philadelphia and State of Pennsylvania, have invented certain new and useful Improvements in Dynamo-Electric Machines, of which the following is a specification.

This invention relates to dynamo electric machines, and more particularly to multiple rotor dynamo electric machines, and has for its principal object the provision of such a machine that will permit of several systems of application and generation of electrical energy.

Another object of the invention is to so combine two dynamo electric machines that both may function as motors in such a manner that the driving shaft will rotate at the cumulative speed of the two.

Another object of the invention is to so combine two dynamo electric machines that one may function as a generator to limit the reactive speed of the other which is acting as a motor, and whose driving shaft will rotate at the differential speed of the two machines.

Another object of the invention is to so combine two dynamo electric machines that mechanical interlocks may be employed to allow either machine to operate at its own speed while the other machine is held out of service.

A still further object of the invention is to so combine two or more dynamo electric machines in which one armature or field element may be rotated by a high speed prime mover, and the other rotating elements caused to take intermediate speeds between the speed of the prime mover and zero.

Other objects and advantages of my invention will be brought out in the following specification and appended claims, and illustrated in the accompanying drawings, in which—

Heretofore the obtaining of slow rotor speeds has necessitated the construction of large diameter machines with a comparatively great number of poles. With my improved construction this is eliminated through having oppositely revolving elements which cause the driving shaft to rotate at a differential speed. In direct current machines it has been the practice to get a wide range of adjustable speeds by variation of field or by a combination of motor-generator-motor set adapted to vary speed through both field and armature control. The first method, on account of commutation conditions, can not well exceed a ten to one ratio of fastest to slowest speed. Commercially this ratio is usually limited to four to one. The application of a machine of this type to a machine tool drive or the like demands usually that it be supplemented by speed change gearing to give all the speeds desired at the main driven member of the machine. With my construction the range of stable speeds may be carried to almost any desired limit so as in most cases to eliminate entirely the necessity of external reduction gearing. This is true because the speed of my machine may be varied throughout the whole range from the differential to the cumulative speed of the two rotors. The second method of speed control involves three dynamo units, whereas mine demands only two. In alternating current machines the same condition mentioned above as to slow rotor speeds without large diameters and a large number of poles holds good. Furthermore, in the matter of getting a wide range of adjustable speeds previous practice has kept the number of stable speeds available to a very few, each speed involving a complete set of windings. With my construction a much greater number and range of speeds is readily available, as will be hereinafter explained.

Figure 3:
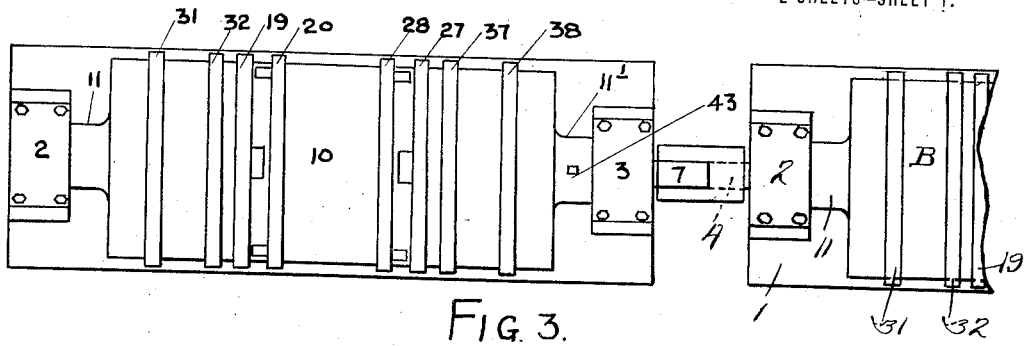
Fig. 3 is a top plan of the machine shown in Fig. 1, showing a second unit of like construction coupled thereto for use when the machine is to be used as a generator in certain special applications.
Figure 2:
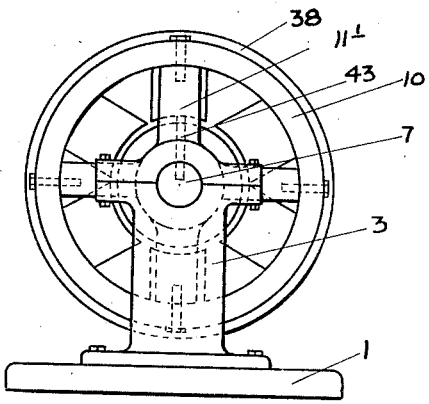
Fig. 2 is an end elevation of the machine shown in Fig. 1.
Figure 1:
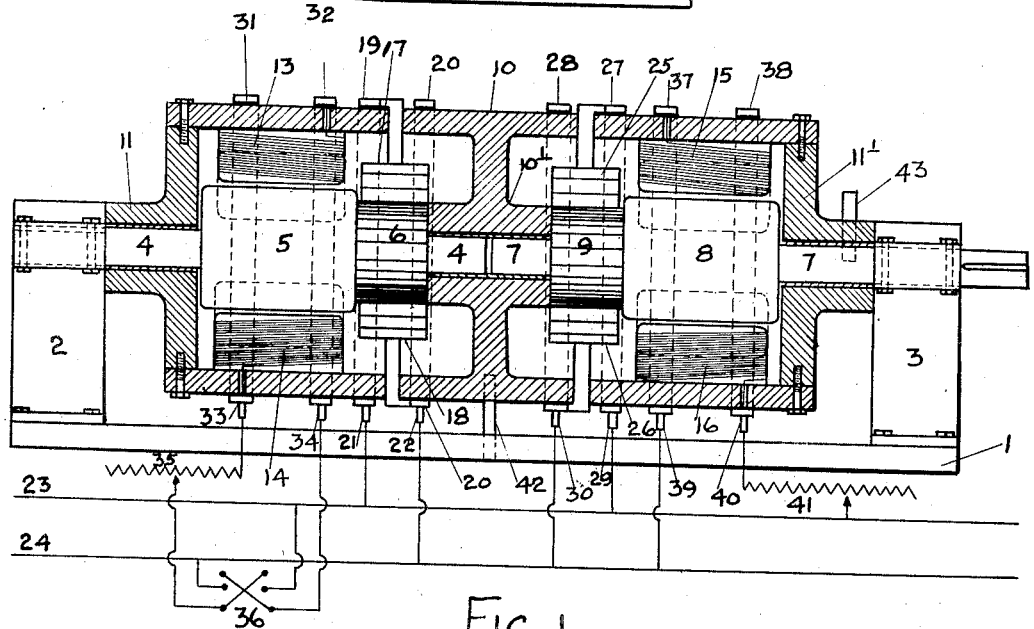
Figure 1 is a sectional side elevation showing in general a direct current dynamo electric machine of the shunt wound type embodying my invention.
Figure 5:
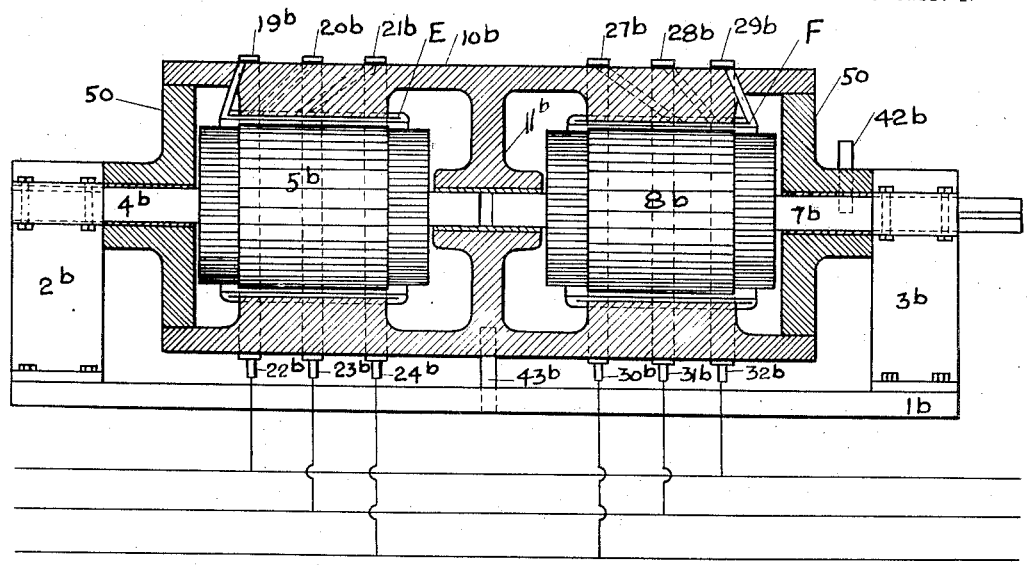
Fig. 5 is a sectional side elevation showing my invention as applied to an alternating current machine.

Referring particularly to Figs. 1 to 3 of the drawings, which show a direct current dynamo electric machine of the shunt wound type having a base 1 and pedestal bearing members 2 and 3. A shaft 4 is mounted in the bearing 2 and is locked against rotation by suitable keys or clamps not shown, and carries an armature 5 and a commutator 6. A second shaft 7 is mounted for rotation within the bearing 3 and carries an armature 8 and commutator 9.

A field frame 10 is mounted to rotate around both armatures 5 and 8 and has a center bearing 10′ adapted to receive and support the inner ends of both shafts 4 and 7. The field frame 10 has end bearings 11 and 11′ adapted to be supported on shafts 4 and 7, respectively. With the above construction it will be readily seen that the field frame 10 is capable of rotation on the armature shafts 4 and 7, and that the armature 8 and shaft 7 are capable of rotation within and relative to the field frame 10.

The field frame 10 carries two field elements which are represented by pole pieces 13 and 14 applying to armature 5, and pole pieces 15 and 16 applying to armature 8.

Current is impressed on or delivered from commutator 6 and armature 5, through brushes 17 and 18 which are connected through rings 19 and 20, and brush or sliding contacts 21 and 22 to power mains 23 and 24. Current is impressed on or delivered from commutator 9 and armature 8 in a similar manner through brushes 25 and 26 which are connected through rings 27 and 28, and brush or sliding contacts 29 and 30 to power mains 23 and 24. The poles 13 and 14 are energized by shunt windings connected through rings 31 and 32, brush or sliding contacts 33 and 34, adjustable resistance members 35 and a reversing switch 36 to mains 23 and 24.

The poles 15 and 16 are similarly connected through rings 37 and 38, sliding contacts 39 and 40, and adjustable resistance member 41 to mains 23 and 24. If found desirable or necessary a reversing switch similar to that used between the resistance member 35 and the mains 23 and 24 may be used between the resistance member 41 and the mains.

Suitable means are provided for locking the field frame 10 to the main base 1, or to the shaft 7 when desired. This means is illustrated in the drawings by pins 42 and 43 respectively. The use of these locking devices is dependent upon the type of the machine used, as will be fully described hereinafter.

The operation of the machine described above, when used as a motor or combination of generator and motor for mechanical application of energy to some external load is as follows—

Assuming that both stop pins 42 and 43 are disengaged, the impressing of the electromotive force on the stationary armature 5 when the poles 13 and 14 are energized will cause a rotation of the field frame 10 which for a given direction of current, strength of current, and strength of field may be assumed to be away from the observer at a fixed rate.

The impression of current on armature 8 when poles 15 and 16 are energized will cause a rotation of the armature 8 relative to field frame 10 which may be toward or from the observer, depending upon the direction of current in the armature 8 and its field. It is, therefore, evident that if both the field frame 10 and the armature 8 are rotating in the same direction, the speed of the rotation of armature 8 and shaft 7 with reference to some external point will be the sum of the speed of the field frame 10 relative to this point, and the speed of the armature 8 relative to the field frame 10. If, however, the armature 8 is rotating in the opposite direction from the field 10, the speed of the armature 8 and its shaft 7, with reference to an external point will be the difference of these two speeds.

In this latter condition, assuming the field frame 10 to be rotating from the observer at 300 R. P. M. and armature 8 rotating toward the observer at a speed of 450 R. P. M. relative to the field frame 10, the net rotation of shaft 7 and armature 8 with reference to an outside point would be toward the observer at a speed of 150 R. P. M. Obviously, any application of load to the armature shaft 7 tends to slow down the shaft, and inasmuch as the machine here considered is a shunt wound type, the speed relation of 450 R. P. M. existing between the field frame 10 and armature shaft 7 will remain relatively constant, and if the shaft 7 is slowed down appreciably below 150 R. P. M. the speed of the field in the opposite direction will be appreciably greater than 300 R. P. M. due to the reactive effect, and under these conditions the armature 5, commutator 6, shaft 4, and field poles 13 and 14 will function as a generator, since the field is being driven by the reactive effect existing between the armature 8 and the poles 15 and 16. This generator, of course, is assumed to be, and must be, designed for a speed of 300 R. P. M. to get this effect, and it is evident that any speeding beyond 300 R. P. M. will cause the conductors of the armature 5 to be cut by the lines of force of the field at a more rapid rate, thereby building up an electromotive force in the generator greater than that existing in the external circuit, thus causing a backward flow of current into the line. However, when the electromotive force generated is greater than that of the external circuit, the generator is compelled to take the load existing in this circuit which will quickly cause it to slow down to its rated speed and reduce its electromotive force to that of the external circuit.

From the above it will be apparent that regardless of the application of the load to the shaft 7, the generator will tend to maintain its inherent speed of 300 R. P. M., and the shaft 7 will likewise tend to maintain its speed of 150 R. P. M. relative to an external point. It will also be apparent that if a sudden lightening of the load on the shaft 7 should take effect, it would tend to allow said shaft and armature 8 to speed up beyond 150 R. P. M., and consequently to allow the field 10 to slow down below 300 R. P. M. In this case a reversal of current in the armature would take place, and the armature 5 and field elements 13 and 14 would function as a motor at a speed of 300 R. P. M.

From the foregoing description it will be readily understood that the differential speed of 150 R. P. M. is just as inherently stable under varying loads as is the speed of the ordinary shunt wound motor.

When it is desired to effect a cumulative, rather than a differential speed of my multiple rotor dynamo electric machine, both rotors function as motors and are moved against external resistance by the application of electrical energy. Therefore, the armature shaft 8 will turn with reference to a fixed point at the sum of its own speed relative to the field frame 10, plus the speed of the field frame 10 relative to the stationary shaft 4, and armature 8 will give the same inherent stability of speed under various loads as will the ordinary shunt wound motor.

It will be readily apparent that by utilizing a machine of this class in which each rotating element has a fixed speed, it is possible by taking advantage of the difference in rotor speeds, to get a slow speed motor without having such extremely large rotor diameters as such a motor would demand in standard construction. Also it will be apparent that by taking advantage of the differential and cumulative speeds of the rotors and having one or both rotors adjustable in speed through variation of field strength, it is possible to develop an adjustable speed motor of far wider speed range than is possible in any of the known types of construction.

If desired to utilize the power from either half of the machine independent of the other, it may be readily accomplished by locking the field frame 10 to the base 1 by the pin 42, thus making the armature 5 and its field inoperative, or by locking the field 10 to the shaft 7, thus making the armature 8 and its field inoperative.

The machine shown in Fig. 1 may also be used as a direct current generator by connection to a high speed prime mover. The advantages of using this machine as a generator will be apparent, since it will entirely eliminate the reduction gearing now necessary to enable such generators to run at a commercially desirable speed. In the construction shown in Figs. 1 to 3, the driving spindle of the prime mover will be coupled to the right-hand or free end of the armature shaft 7, as shown in Fig. 3, and when the field elements 15 and 16 applying to the armature 8 are energized they will tend to rotate at the same speed as the armature, but will be restrained from doing so since the field elements 13 and 14 applying to the non-rotating armature 5 are likewise energized, and their rotation past the conductors of armature 5 will cause a cutting of the lines of force, thereby setting up a current in this armature which will flow into the external circuit, and as a result, a slippage in speed will exist between armature 8 and its field elements 15 and 16, and lines of force will be cut at this point as well as at the conductors of the armature 5, and a current will be set up in armature 8 which will likewise flow into the external circuit.

In certain instances even the reduced speed above described would be undesirably high, and to overcome this objection the generator will be built in a multiple rotor form as indicated in Fig. 3, and designated by the letter B. This could either be an ordinary dynamo having a field member and an armature member, one of which rotated and the other of which was stationary, in which event shaft 4 would be a rotating shaft extended through the bearing 2 and coupled to the prime mover, or could be a duplication of the unit shown in Fig. 1, with the exception that the shaft 4 of unit "B" would be rotatably mounted in the bearing 2 rather than rigid as described, and this shaft would be coupled to the free end of the shaft 7 of my machine, and shaft 7 of unit "B" coupled to the prime mover.

Figure 4:
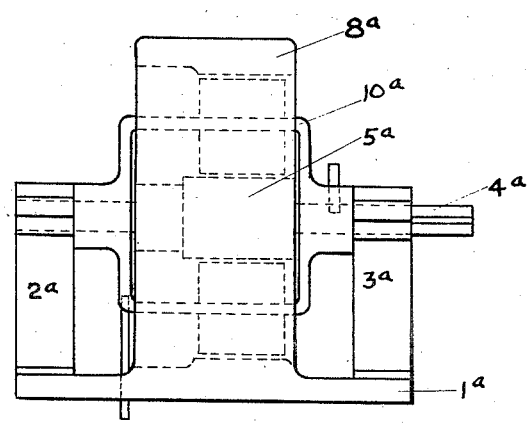
Fig. 4 is a side elevation showing a modified construction of a similar machine embodying the same principles as Fig. 1.

Fig. 4 shows a modified form of a shunt wound machine embodying the same principle as Fig. 1, and comprises a base 1ª, pedestal bearings 2ª and 3ª. A shaft 4ª is rotatably mounted in said bearings and carries an armature member 5ª. A field member 10ª is rotatably mounted on said shaft within a stationary armature member 8ª which is supported and mounted on the base 1ª.

The operation of the device shown in Fig. 4 is similar to that shown in Fig. 1. The impressing of current upon the stationary armature will cause the field member to rotate, and the impressing of current on the armature 5ª will cause a rotation of such armature relative to the field frame. The field frame 10ª may be pinned to the shaft 4ª when desired, or pinned or locked to the base 1ª, in a manner similar to that of the construction shown in Fig. 1.

The construction shown in Fig. 3 illustrates my invention as applied to an alternating current machine. This machine is constructed similar to the ordinary squirrel cage induction motor, and is shown connected to a 3-phase source of electrical energy. Throughout the description of this alternating current machine, the terms "stator" and "rotor" are used to designate the field and armature parts functioning similarly to the field and armature parts so termed in the ordinary form of squirrel cage type of alternating induction motors, regardless of whether they are stationary or rotary. The construction is very similar to Fig. 1, and comprises a base member 1$^b$ and pedestal bearing members 2$^b$ and 3$^b$. A shaft 4$^b$ is mounted in the bearing 2$^b$ and locked against rotation by suitable keys or clamps, not shown, and carries a squirrel cage rotor member or armature 5$^b$. A second shaft 7$^b$ is mounted for rotation within the bearing 3$^b$ and has a squirrel cage rotor or armature 8$^b$ rotatably mounted thereon.

A stator or field frame member 10$^b$ is mounted to rotate around the rotors 5$^b$ and 8$^b$, and has a central bearing 11$^b$ adapted to receive and support the inner ends of both shafts 4$^b$ and 7$^b$, and is supported at its ends by bearings 50 on the shafts 4$^b$ and 7$^b$, respectively. The frame 10$^b$ carries fields E and F directly over the rotor or armature members 5$^b$ and 8$^b$, respectively.

The differences from the ordinary conditions of an alternating current machine employing squirrel cage rotors are, that what is normally the rotor is in one instance held stationary, and the stator, which is normally held stationary, rotates, and in the other instance both the rotor and stator rotate. The stator receives current for its windings over the rotor 5$^b$, through rings 19$^b$, 20$^b$, and 21$^b$, and sliding or brush contacts 22$^b$, 23$^b$, and 24$^b$, and the other windings of the stator over the rotor 8$^b$ receive their current through rings 27$^b$, 28$^b$, and 29$^b$, and brush or sliding contacts 30$^b$, 31$^b$, and 32$^b$. Suitable locking pins for locking the stator member 10$^b$ are provided, and, as shown, comprise the pin 43$^b$, adapted to lock the stator in the base 1, and the pin 42$^b$ adapted to lock the stator to the shaft 7$^b$.

In the ordinary induction motor, alternating currents flowing through the stator or field windings produce a rotating state of magnetism in the laminated iron of the stator, due to the growing and dying currents, and positive and negative electromotive forces following in sequence, phase upon phase, in these windings. The rotating magnetism so set up induces currents in the short circuited rotor windings, and the stator magnetism exerts force on these induced currents and causes the rotor to revolve at a slightly less than synchronous speed, or, stated another way, the same speed as the rotating magnetic field. While such a motor has no fixed poles, the winding of the coils in the iron of the stator, and the flow of current therein, causes certain points of the stator to act as poles. Conversely, when acting as a generator, the induction machine must be driven at a speed slightly above synchronism, and current will then flow from the stator into the external circuit.

The operation of my improved machine is as follows—

Current being applied to the device in the same manner as to the well-known form of alternating current motors of the induction type, a rotating state of magnetism will be set up in the windings of the stator members, and thus will induce currents in the windings of the rotor members. The magnetism of the stator will exert force on the induced currents in the rotor windings and cause a revolving of the parts.

When the two rotating elements, the field frame or stator member 10$^b$ and rotor or armature 8$^b$ are revolving in opposite directions, and the speed of the rotor 8$^b$ with reference to an external point is the differential of the two speeds, an increase of load on the shaft 7$^b$ will tend to slow it down, and thus increase the speed of the field frame or stator 10$^b$, and this in turn will cause the stationary member or armature 5$^b$ and its field E on the field frame or stator member 10$^b$ to function as a generator and build up an electromotive force which will cause current to flow into the external circuit, thereby causing field frame 10$^b$ to slow down again and bring the speed of the rotor 8$^b$ to normal. On the other hand, no decrease of load on the shaft 7$^b$ will cause the armature or rotor 8$^b$ to rotate at a speed beyond synchronism. When the rotating elements are revolving in the same direction, both halves of the unit, that is, both armatures and the fields E and F on the stator frame 10$^b$ function as induction motors.

The machine shown in Fig. 3 will have the same advantages as the machine shown in Fig. 1. That is, it will have a slow rotor speed without the large diameter and large number of poles necessary in standard construction, and it will also have a wider range of speeds than the motors of standard construction. This is evident from the fact that there are four fundamental speeds available from my construction in its simplest form. With two sets of windings for each stator, which is a comparatively simple arrangement, my construction would give twelve speeds, each relatively stable under variable loads. In any ordinary squirrel cage induction motor, or any other alternating current motor of usual design, it would be a very difficult problem to incorporate a sufficient number of windings to give any considerable number of speed changes, and lack of speed changes has been one of the chief factors in retarding the application of alternating current motors to many classes of service.

When this construction is to function as a generator, the rotors must be driven by a prime mover beyond synchronous speed, in order to force current into the mains.

Of course it will be readily understood that the type of machine shown being an inductor, it could only function as a generator when operated in parallel with one or more alternators which would excite its windings, but the same construction could be employed when desired on any other type of alternating current machine.

It will be readily understood from the foregoing description and the numerous examples cited, taken in connection with the drawings, that the principal novelty of my improvement is a combination of two or more dynamo electric machines to function as either a motor or generator, or both motor and generator. Throughout the above description, it is understood that the terms "armature" and "field" are used interchangeably.

Having thus described my invention, what I claim is—

1. A multiple dynamo electric machine comprising a plurality of armature members, a field frame having a field for each of said armatures, said frame being adapted to rotate relative to both of said armatures, means for locking said frame against rotation, and means for locking said frame to rotate integrally with one of the armatures.

2. A multiple dynamo electric machine comprising in combination, a base, a stationary armature member, a shaft having a rotary armature thereon, a field frame mounted for rotation relative to, and having field windings for, each of said armatures, and selective means for locking said field frame against rotation relative to either of said armatures.

3. A multiple dynamo electric machine comprising in combination, a base, pedestal bearing members on said base, a shaft mounted in each of said pedestal bearings, one of said shafts being rigid and the other of said shafts being rotatable, an armature member on each of said shafts, a field frame journaled on said shafts having field windings adjacent each armature, said field frame being adapted to rotate relative to each of said armatures, means for supplying current to said machine, and means for locking said field frame against rotation relative to either of said armatures.

4. A multiple rotor dynamo electric machine comprising a base, a stationary armature, a rotary armature, a field member adapted to rotate relative to said armatures, and means for selectively locking said field member against movement relative to either of said armatures.

5. In combination, two dynamo electric machines comprising four energizable elements, two of said elements being armatures, and the other two of said elements being fields mounted in a rotary frame, one of said armatures being rotative relative to said fields, means for electrically energizing said four elements, and means for selectively interlocking said fields non-rotatively to said base or to said rotating armature as desired.

6. A multiple dynamo electric machine comprising a base, an energizable element mounted stationary on said base, a second energizable element mounted on a shaft journaled in bearings on said base, a frame having two other energizable elements thereon mounted for rotation relative to both of said first named elements, means for locking said frame and its elements non-rotatively to said base, and means for electrically energizing all of said elements.

7. A multiple dynamo electric machine comprising in combination, a base, pedestal bearing members on said base, a shaft mounted in each of said pedestal bearings, one of said shafts being rigid and the other of said shafts being rotatable, an energizable element mounted rigidly on each of said shafts, a frame member having two other energizable elements thereon mounted on said shafts for rotation normally around both of said first named elements, means for locking said frame and its elements non-rotatively relative to either of said two first named elements, and means for electrically energizing all of said elements.

8. A multiple dynamo electric machine comprising in combination, a base, pedestal bearing members on said base, an armature shaft mounted in each of said pedestal bearings, one of said shafts being rigid and the other of said shafts being rotatable, an armature rigidly secured to each of said shafts, a barrel like frame member inclosing said armatures and carrying two sets of field elements, said frame member being mounted on said shafts for rotation normally around both of said armatures, a locking pin adapted to be inserted in registering apertures formed in said frame member and said rotatable shaft to lock said frame non-rotatively relative to the armature on said shaft, and a second locking pin adapted to be inserted in registering apertures in said base and said frame to lock said frame non-rotatively relative to said armature on said rigid shaft.

In witness whereof, I have hereunto set my hand.

HERBERT S. EADES.